United States Patent
Pehrson et al.

(10) Patent No.: US 8,886,187 B2
(45) Date of Patent: Nov. 11, 2014

(54) SYSTEM AND METHOD FOR UTILIZING A SHARED NETWORK HAVING ONE MOBILE NETWORK CODE

(75) Inventors: Marten Pehrson, Danderyd (SE); Michael Winkler, Steinabrueckl (AT); Jiri Rynt, Dolni Brezany (CZ)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 420 days.

(21) Appl. No.: 12/596,665

(22) PCT Filed: Apr. 18, 2008

(86) PCT No.: PCT/EP2008/054767
§ 371 (c)(1),
(2), (4) Date: Feb. 24, 2010

(87) PCT Pub. No.: WO2008/129014
PCT Pub. Date: Oct. 30, 2008

(65) Prior Publication Data
US 2010/0144311 A1    Jun. 10, 2010

Related U.S. Application Data

(60) Provisional application No. 60/912,761, filed on Apr. 19, 2007.

(51) Int. Cl.
*H04W 4/00* (2009.01)
*H04W 8/06* (2009.01)
*H04W 48/18* (2009.01)

(52) U.S. Cl.
CPC .............. *H04W 8/06* (2013.01); *H04W 48/18* (2013.01)

USPC ...... 455/435.2; 455/433; 455/406; 455/432.1

(58) Field of Classification Search
USPC .................. 455/405–409, 432.1–433, 426.1, 455/435.1–435.3
See application file for complete search history.

(56) References Cited

U.S. PATENT DOCUMENTS

| | | | | |
|---|---|---|---|---|
| 5,752,188 | A * | 5/1998 | Astrom et al. | 455/433 |
| 6,081,711 | A * | 6/2000 | Geulen | 455/432.1 |
| 6,330,445 | B1 * | 12/2001 | Skog et al. | 455/433 |
| 2003/0013443 | A1 * | 1/2003 | Willars et al. | 455/432 |

(Continued)

OTHER PUBLICATIONS

Digital cellular telecommunications system (Phase 2+); Universal Mobile Telecommunications System (UMTS); Service aspects and requirements for network sharing (3GPP TR 22.951 version 6.1.0 Release 6, published Mar. 2003.*

(Continued)

*Primary Examiner* — Daniel Lai (57) ABSTRACT

A system and method of selecting a network operator by a roaming subscriber in a shared network. The method begins by a roaming subscriber, UE, entering the shared network. A query is provided to the UE of a selection of at least two network operators operating within the shared network. The subscriber then selects a desired network operator for use in the shared network. The selection is sent and stored in a VLR in the shared network. A call is initiated by the UE in the shared network and routed in accordance with the selected network operator. Preferably, the UE sends a USSD string providing the desired network operator to the VLR. The USSD string triggers a USSD application for using the selected network operator.

14 Claims, 8 Drawing Sheets

(56) References Cited

U.S. PATENT DOCUMENTS

| | | | |
|---|---|---|---|
| 2005/0075129 A1 | 4/2005 | Kuchibhotla et al. | |
| 2005/0213566 A1 | 9/2005 | Jutila et al. | |
| 2005/0261005 A1* | 11/2005 | Hu | 455/456.5 |
| 2008/0194232 A1* | 8/2008 | Muratore et al. | 455/411 |

OTHER PUBLICATIONS

Universal Mobile Telecommunications System (UMTS); Telecommunication management; Charging management; Circuit Switched (CS) domain charging (3GPP TS 32.250 version 6.4.0 Release 6, published Mar. 2006, p. 9,14,16,17,19,66,70 and 79.*

Digital cellular telecommunications system (Phase 2+); Unstructured Supplementary Service Data (USSD); Stage 3 (GSM 04.90 version 7.0.1 Release 1998, published Jan. 2000.*

Common Charging Output ASN.1 Result by Ericsson, dated Jun. 5, 1997.*

"Universal Mobile Telecommunications System (UMTS); Network sharing; Architecture and functional description (3GPP TS 23.251 version 6.3.0 Release 6); ETSI TS 123 251" ETSI Standards, Lis, Sophia Antipolis Cedex, France, vol. 3-SA2, No. V6.3.0 Mar. 1, 2005.

* cited by examiner

SYSTEM AND METHOD FOR UTILIZING A SHARED NETWORK HAVING ONE MOBILE NETWORK CODE

This application claims the benefit of U.S. Provisional Application No. 60/912,761, filed Apr. 19, 2007, the disclosure of which is fully incorporated herein by reference.

TECHNICAL FIELD

The present invention relates generally to communications networks, and in particular, to shared networks having only one Mobile Network Code (MNC).

BACKGROUND

Currently, there are implementations of a shared Global System for Mobile Communication (GSM) network where a Base Station Subsystem (BSS) and a core network are shared and where only one Mobile Network Code (MNC) is used. In-roaming subscribers may be assigned to this network. Calls and other associated revenues from these in-roam subscribers are currently distributed based on a set percentage between the operators. Alternately, the calls and revenue may be assigned based on an International Mobile Subscriber Identity (IMSI).

However, in the current implementation, both network operators must have their own roaming agreements and tariffs for their customers. However, in currently existing implementations of a "common shared network," in-roaming subscribers cannot "select" their roaming network and, therefore, no selection of roaming-tariff may be performed. Thus, the network performs the selection based on a predefined configuration. However, in many countries, this is not acceptable because regulators will not allow the network to make the selection, since the call costs cannot be charged properly and the process is not transparent for the user.

SUMMARY

Therefore, a technical solution is required that allows the end-user to select the partner network for roaming manually. The present invention provides a system and method which allows a roaming subscriber to select a specific network for roaming manually.

Thus, in one embodiment, the present invention is directed to a method of selecting a network operator in a shared network. The method begins by a roaming subscriber, UE, entering the shared network. A query is provided to the UE of a selection of at least two network operators operating within the shared network. The subscriber then selects a desired network operator for use in the shared network. The selection is sent and stored in a VLR in the shared network. A call is initiated by the UE in the shared network and routed in accordance with the selected network operator. Preferably, the UE sends a USSD string providing the desired network operator to the VLR. The USSD string triggers a USSD application for using the selected network operator.

In another embodiment, the present invention is directed to a system for selecting a network operator in a shared network. The system includes a UE roaming in the shared network. The UE is queried with a selection of at least two network operators operating within the shared network. The UE then selects a desired network operator. The system also includes a node for storing the selected network operator and routing a call initiated in the shared network in accordance with the selected network operator.

In still another embodiment, the present invention is a node for implementing a selected network operator by a UE in a shared network. The node queries the UE with a selection of at least two network operators operating within the shared network. The node receives and stores a selection of a desired network operator from the UE. The node also routes a call initiated in the shared network by the UE in accordance with the selected network operator.

DETAILED DESCRIPTION OF EMBODIMENTS

Figure 1:
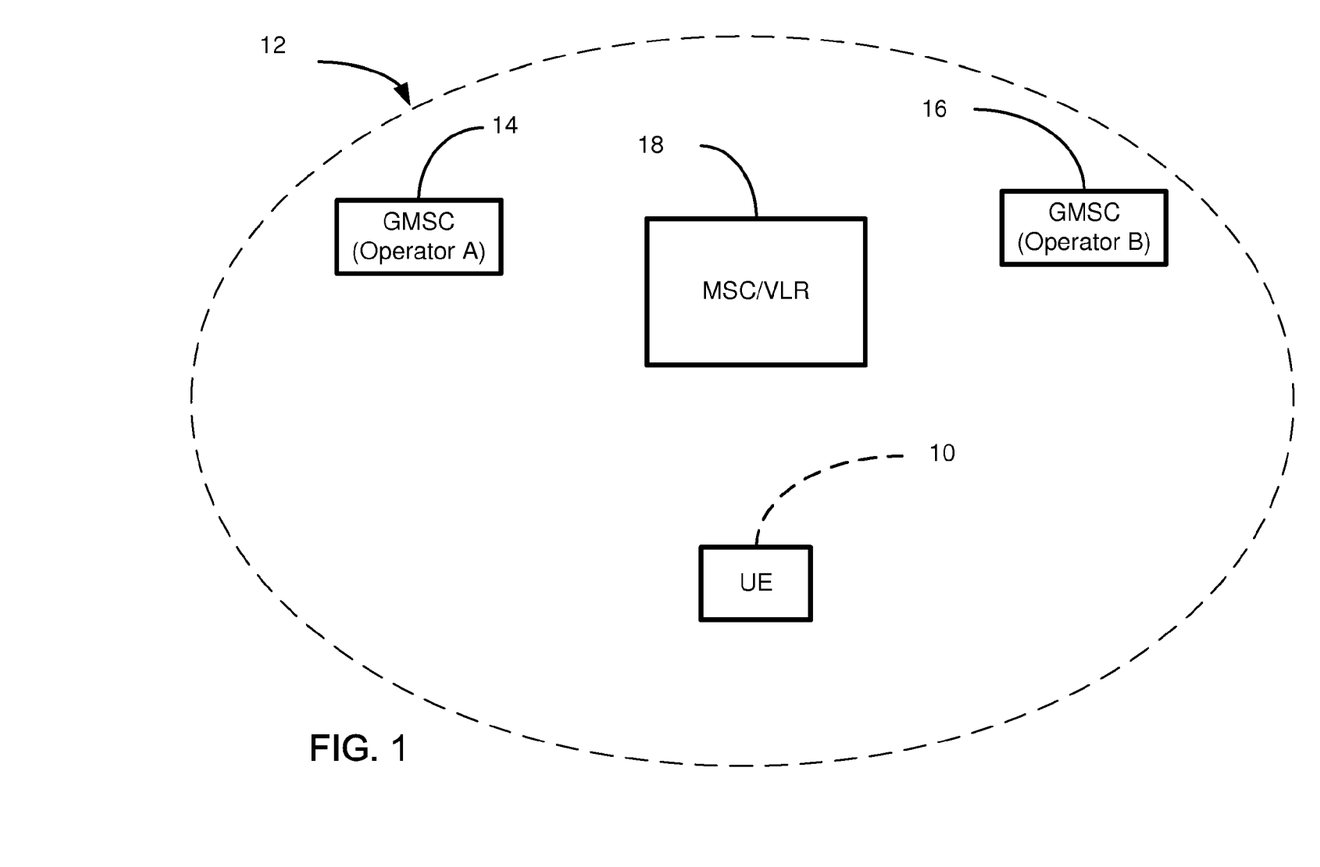
FIG. 1 is a simplified block diagram of an in-roaming subscriber roaming in a common shared network.

The present invention is a method and system for allowing an in-roaming subscriber to manually select a network in a common shared network having only one MNC. FIG. 1 is a simplified block diagram of an in-roaming subscriber roaming in a common shared network 12. When an in-roaming subscriber (UE 10) enters the shared network 12, a message is sent to the UE indicating that the in-roaming subscriber has entered a shared network. The message also provides an option to chose an operator A or an operator B as a desired roaming network. The shared network includes a GMSC (Gateway MSC) 14 operated by the operator A and a GMSC 16 operated by the operator B. The shared network also includes a Mobile Switching Center/Visitor Location Register (MSC/VLR) 18. Although two GMSCs and two operators are depicted, the present invention may be utilized where any number of operators operate within the shared network.

In the present invention, a new Unstructured Supplementary Service Data (USSD) application identifier is preferably introduced and utilized. A new USSD application is associated with the USSD application identifier in the MSC/VLR 18.

This USSD application identifier provides a desired selection by the subscriber. This identifier is analyzed in the MSC/VLR, where a determination of the selection by the subscriber of the desired operator is stored in a VLR database. Preferably, the subscriber's selection can be changed at any time after the subscriber initially makes the selection.

Preferably, the MSC/VLR 18 performs call routing branching on the network selection. For call routing, this selection preferably is made for all call types. Additionally, for charging, charging data for any call within the selected network is also identified.

In the preferred embodiment of the present invention, information about the selected network may be transferred when the subscriber moves to a new MSC/VLR area. In this embodiment, a new VLR queries the old VLR with a SEND IDENTIFICATION MAP V3 message about existing authentication information. The SEND IDENTIFICATION MAP V3 RESULT message may be modified to contain the "network selection information."

In current shared networks, problems also result from in-roaming within other countries. In most instances, operators are not willing to forego income from other roaming subscribers in a shared network, therefore a mobile virtual network operator (MVNO) solution is not suitable for implementation in a shared network.

In the present invention, the MSC/VLR 18 is configured to receive the subscriber's operator choice, which is stored in the VLR of the MSC/VLR. Any calls are then routed towards the proper GMSC, GMSC 14 or GMSC 16, based on the subscriber's stored selection. Preferably, the subscriber's selection is stored as Mobile Originated (MO) and Call Forwarding (CF) Call Detail Record (CDR) data. In one embodiment of the present invention, the subscriber's operator selection is transferred and stored in a new VLR when moving to another MSC.

In one embodiment, a standard welcome Short Message Services (SMS) message is provided to the in-roaming subscriber to indicate that the subscriber has reached a shared network and may choose one of operators via a call independent USSD string.

Figure 2:
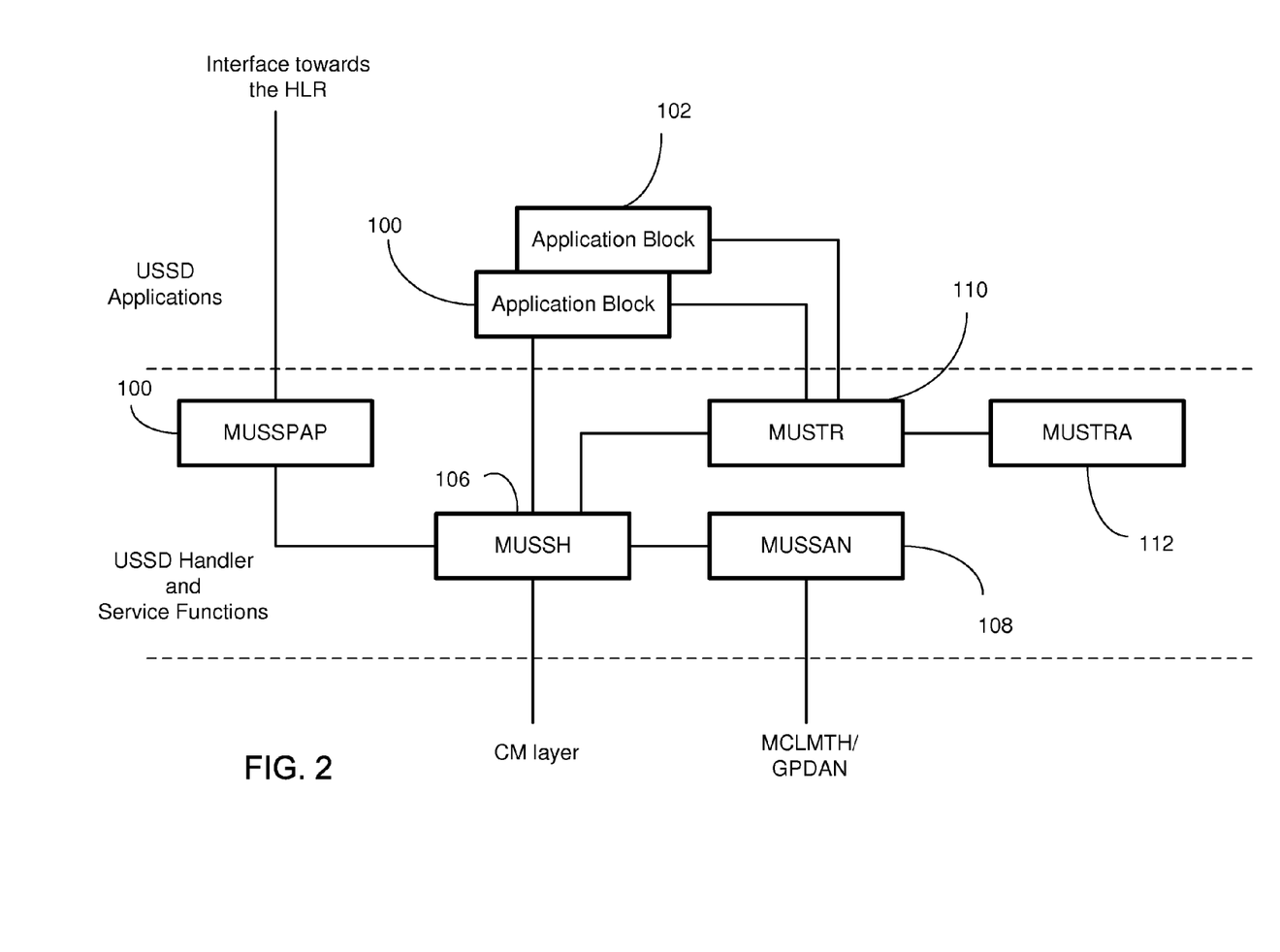
FIG. 2 is a simplified block diagram of components of a USSD platform in one embodiment of the present invention.

In the present invention, an application module that implements mobile access and gateway functions (Mobile Access and Gateway Application Module (MAGAM)) is capable of receiving the subscriber's operator selection, which is stored in the VLR. The present invention may utilize an Unstructured Supplementary Service Data (USSD) operation. FIG. 2 is a simplified block diagram of components of a USSD platform in one embodiment of the present invention. USSD applications may include an Application block 100 and Application block 102. Although two application blocks are depicted, the present invention may utilize any number of application blocks. A Mobile Telephony Unstructured Supplementary Services Procedure MAP interface (MUSSPAP) 104 provides an interface to an HLR. A Mobile Telephone USSD Handler (MUSSH) 106 provides control links to a Call Management (CM) layer and to the USSD applications. In addition, the MUSSH initiates USSD string analysis and performs forwarding, and relay to and from the specific USSD application. A Mobile Telephony USSD Analysis (MUSSAN) 108 performs USSD string analysis for determining the USSD application. The MUSSAN interfaces with the MCLMTH (interface application between users and a connectionless message transfer service application) and the GPDAN (General Purpose Digit Analysis application—handles and analyzes digit series with associated result data for user functions) A Mobile Telephony USSD String (MUSTR) 110 provides a USSD string data. A Mobile Telephony USSD String Administration (MUSTRA) 112 provides administration of the MUSTR.

The MUSSAN 108 receives a USSD application identifier as a result of the USSD string analysis. The following USSD application identifiers are shown in table 1 below.

TABLE 1

| Identifier | Block | Application |
| --- | --- | --- |
| 0 | MUSSPAP | Transfer of USSD operations towards HLR |
| 1 | MUDENY | Standard denial USSD application |

TABLE 1-continued

| Identifier | Block | Application |
| --- | --- | --- |
| 2 | MUATAI | Indication of tariff area to mobile subscriber |
| 3 | MUAACCT | Handling of account information |

In the preferred embodiment of the present invention, the subscriber provides the USSD string to trigger the functionality (i.e., selection of network operator). In one embodiment of the present invention, a new USSD application identifier is utilized to initiate the USSD application. This USSD application is preferably connected in accordance with the operator via a command ANGSI (command that allows defining digit series in the GPDAN) The USSD application is preferably set as depicted below, since the corrections may use a hard coded value (e.g., 7). In this embodiment, the USSD application has to be set, since the corrections will use a hard coded value:

ANGSP:DSO=?, S=???;
ANGSE:DSO=?, S=???;
ANGSI:DSO=?, S=???, RES=APP . . . .

Preferably, the USSD application identifier is currently not in use to provide a unique identifier in the network.

In one embodiment of the present invention, a USSD string, dXc# is used, where d=1, 2, or 3 characters of the set (*, #), X=2 or 3 decimal characters of the set (0-9) and c=*followed by characters (optional). X is known as the service code and identifies the service requested by the user (defined by the operator). c is the actual user information, processed by the service application. For example, *#12*Special offer, call 2345 now!#.

In one embodiment, the USSD string for an operator preference is identified by the MUSSAN 108. The MUSSAN indicates the operator preference to the MUSSH 106 in a signal USSIDENTIAPPLR. Since a MUATAI (application that handles Mobile Telephony USSD Application Tariff Area Indication procedures) is misused for the requested functionality, the MUSSAN 108 passes the MUATAI block reference towards the MUSSH 106. The MUSSH receives the application identifier for the MUATAI, but indicates the new application information towards the MUATAI.

The main functionality of the new application is implemented in the MUATAI. At reception of the application identifier, the "Indication of tariff area to mobile subscriber" related functionality is bypassed. In addition, the MUATAI preferably retrieves an MTV (application in MSC that handles visiting subscriber data) pointer with a signal IDENTIFYMS/~ACK (existing signal, but new for the MUATAI) from a MSNAN. A MUATAI then establishes a new signal interface towards the MTV and provides the end-user's operator choice. The MTV then stores this information for later use.

For a situation where a call originated by the UE 10, the MAGAM reads subscriber data from the VLR and is prepared to receive a parameter indicating the end-user's operator selection. The MTV may also be prepared to send this parameter. The MAGAM (MTACC) may then request two new International Mobile Subscriber Identity (IMSI) number series analysis results indicating the origin for B-Number analysis for all subscribers. The term B-Number origin specifies a routing table in MSC, i.e. it identifies which routing table to analyze. An MSC may support a plurality of different routing tables for digit analysis. A specific number, e.g. 133, defined in a first B-Number origin can be mapped to a first target, e.g. the police. In a second B-Number origin the same number specifies a call to a second target, e.g. the fire brigade. In both cases the user dials the same number, here 133, but depending on the B-origin the call is connected to different targets.

After receiving the results of the analysis, the MAGAM may then select one of these origins for B-Number analysis, since B-Number origin depends on the subscriber's operator choice parameter, which is already received and stored in the VLR.

For any kind of Originating Customized Applications for Mobile Network enhanced Logic (CAMEL) call, the MAGAM (MTACC) may store one of the origins of B-Number as a new instance of an OIP (Open Intra node Protocol) National supplementary Information parameter (NSIP). This value depends on subscriber's operator choice already received and stored in VLR. The B-Number origin for CAMEL calls is preferably not modified.

For the situation where call forwarding is implemented in the MSC/VLR 18, the MAGAM (MTBSS) may read subscriber data from the VLR and is prepared to also read the parameter indicating the subscriber's operator selection. In addition, the MTV is prepared to send this parameter.

Additionally, the MAGAM (MTBSS) requests two new IMSI number series analysis results indicating the origin for B-Number analysis. Upon receipt of the results of the analysis, the MAGAM (MTBSS) selects one of the origins for B-Number analysis, since B-Number origin is dependent upon the subscriber's operator selection parameter, which is already received and stored in the VLR.

For any kind of Originating CAMEL call, the MAGAM (MTACC) stores one of the origins of the B-Number as a new instance of the OIP National supplementary Information parameter (NSIP). The value depends on the subscriber's operator choice, which is already received and stored in the VLR. Preferably, the B-Number origin for CAMEL calls is not modified.

For the routing of originating CAMEL call for in-roamer subscribers, after Service Control Point (SCP) handling, an SSFAM (group of applications providing IN service switching function in MSC/VLR) checks for the presence of an Origin for B-Number analysis (OBA) parameter as an instance of the OIP National supplementary Information parameter (NSIP). If the OBA parameter is present, the SSFAM writes it as an OIP origin for B-number parameter. The SSFAM may also remove the OBA parameter from the NSIP parameter.

For charging, the MAGAM (Media Terminal Adapter (MTA), MRR) stores a new parameter in the Mobile Originating and Call forwarding CDR indicating the subscriber's operator choice. MRR is part of the Mobile Switching Subsystem (MSS) in Mobile Access and Gateway Application Module (MAGAM). MRR handles the re-routing of a mobile-terminating call due to the following traffic cases in Mobile Services Switching Center (MSC)/Visitor Location Register (VLR) Server:

Call forwarding on mobile subscriber busy;
Call forwarding on no reply;
Call forwarding on mobile subscriber not reachable;
Call forwarding to the Intelligent Network (IN) due to any subscription-based originating IN/Customized Applications for Mobile Network Enhanced Logic (CAMEL) service; and
Single personal number service.

For the MTA and MRR to store this new parameter in a mobile originated (MO) call detail record (CDR), the subscriber's choice is passed within a communications facility (CF) CDR from a MTACC (Mobile Telephony Traffic Coordinator—handles mobile originated calls) or a MTBSS (Mobile Telephony Traffic Coordinator—handles the invocation of subscriber services for mobile-terminating calls in the MSC/VLR server) respectively. Preferably, a new tag DI is utilized for the new field in the CDR.

When a subscriber moves from one MSC/VLR to another MSC/VLR within the shared network, the MAGAM (MSECAP3) for the new VLR receives a request for retrieving the IMSI and authentication sets from the Previous VLR. The previous VLR then sends the SEND IDENTIFICATION MAP V3 message. When the MAGAM (MSECAP3) receives the result, apart from the IMSI and authentication sets, the MAGAM (MSECAP3) reads a new parameter containing the end-user's operator selection in the extension container in a SEND IDENTIFICATION MAP V3 Result. This information is stored in a VLR record in the new VLR. Upon receiving the request for sending the IMSI and authentication sets to the new VLR by MAGAM (MSECAP3) of the previous VLR, the MAGAM retrieves from the MTV the subscriber's operator choice and stores it in an extension container of a SEND IDENTIFICATION MAP V3 Result message.

In one embodiment of the present invention, two new IMSI number series analysis results are introduced in order to indicate the origins of B-number analysis in calls from a UE for in-roaming mobile subscribers that depend on the subscriber's operator choice. This is preferably only applicable for in-roaming subscribers. In addition, restart impacts are foreseen in order to store and translate the type of miscellaneous analysis result. DBS commands may be used to update the CHSFILTABLE in order to avoid the restart and to make the desired updates in the MAGAM.

When changing from one MSC/VLR to another MSC/VLR, the new stored operator preference within the VLR may not be available. In one embodiment, a welcome SMS may be sent every time a subscriber enters a new MSC or by updating the cooperating VLR functionality and passing the new flag from one VLR to the other. In another embodiment, an update to the cooperating VLR functionality may be provided.

If the roaming subscriber detaches (and data is lost in VLR) and attaches towards one MSC/VLR, no new welcome SMS is sent in case the subscriber attaches again. To solve this problem, a welcome SMS may again be sent to the subscriber.

Figure 3:
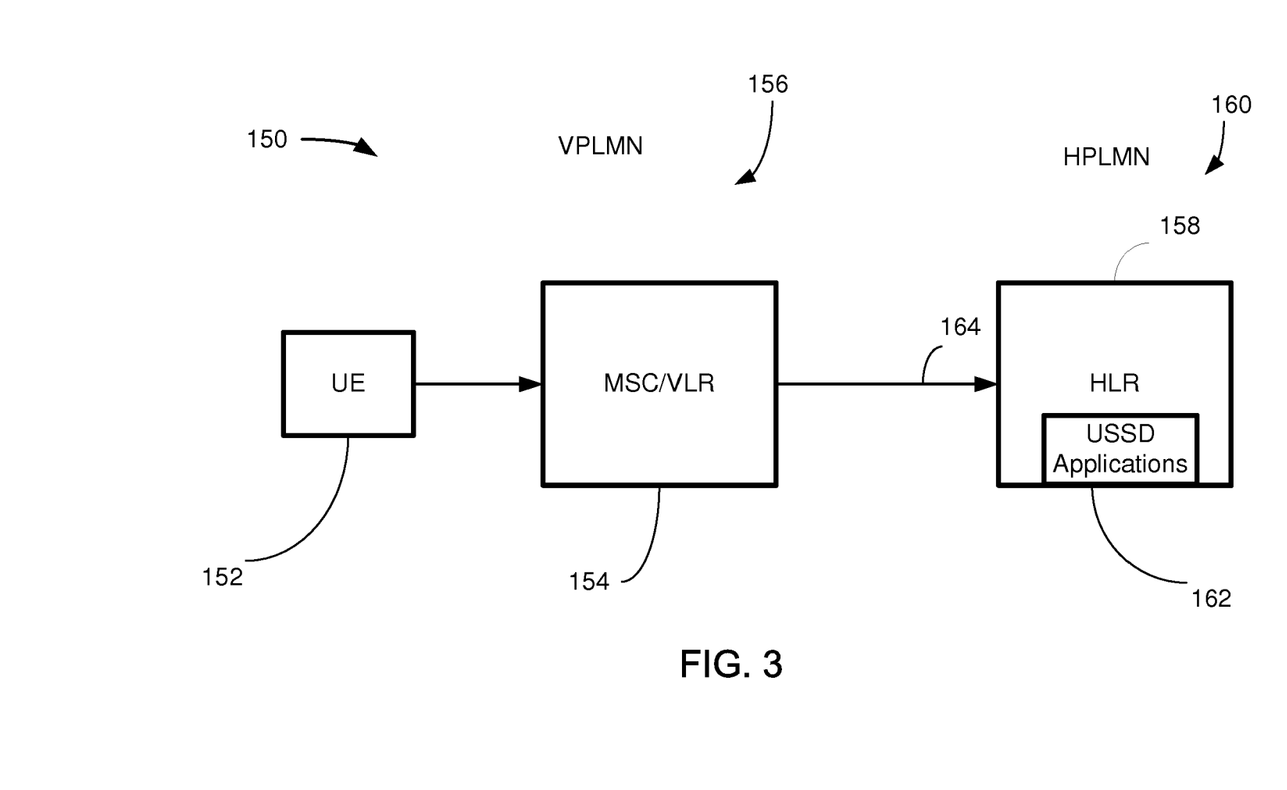
FIG. 3 is a block diagram of a USSD application allocation in a first embodiment of the present invention.

FIG. 3 is a block diagram of a USSD application allocation 150 in a first embodiment of the present invention. The allocation includes a UE 152 and an MSC/VLR 154 in a Visited Public Land Mobile Network (VPLMN) 156. An HLR 158 resides in a Home Public Land Mobile Network (HPLMN) 160. The HLR includes a plurality of USSD applications 162. A USSD application is an entity that is able to perform a service operation. A service operation is identified by the service code included in the USSD string. An interface 164 is provided between the MSC/VLR and the HLR and utilizes a MAP V1 protocol.

Figure 4:
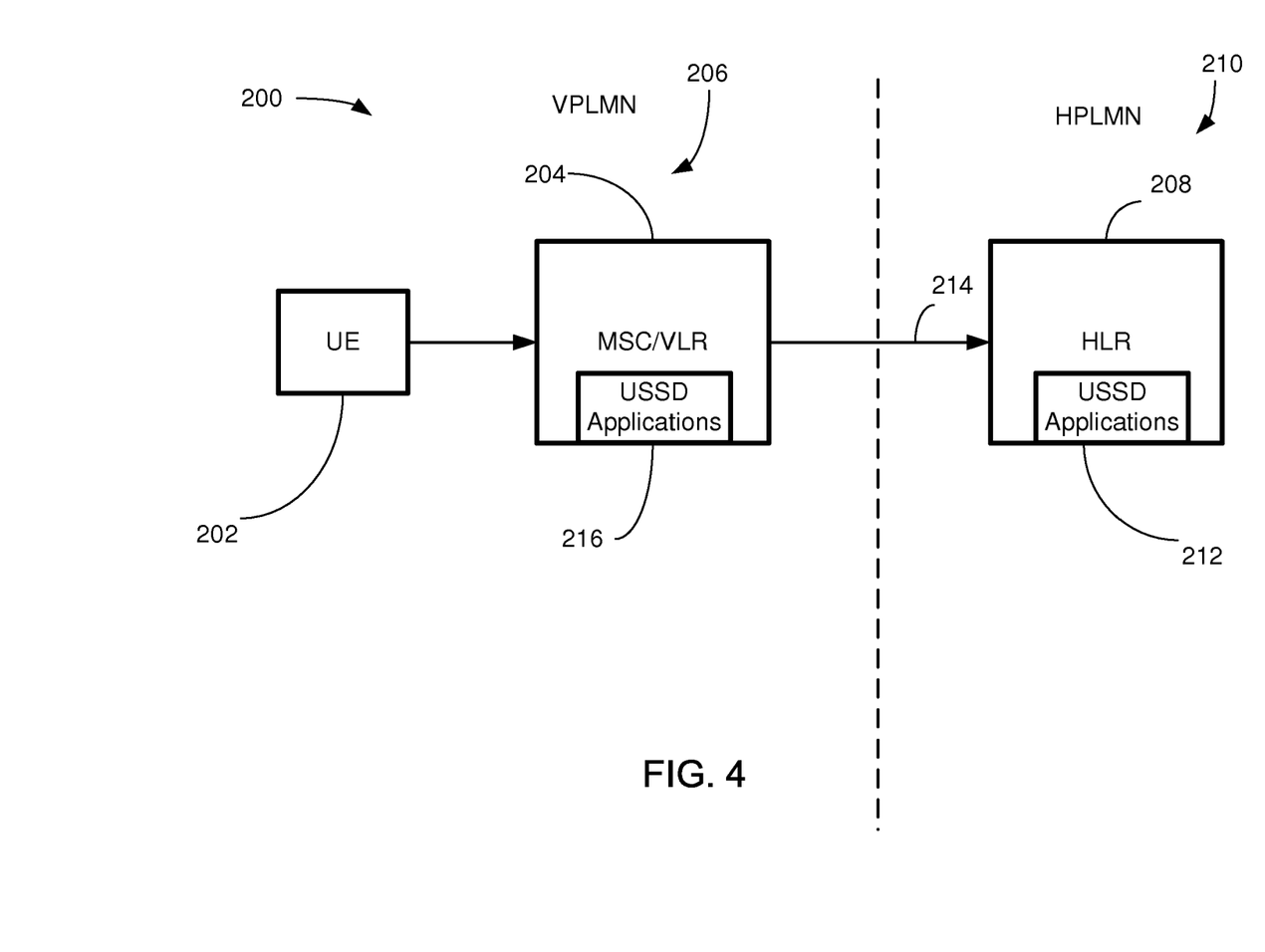
FIG. 4 is a block diagram of a USSD application allocation in a second embodiment of the present invention.

FIG. 4 is a block diagram of a USSD application allocation 200 in a second embodiment of the present invention. The allocation includes a UE 202 and an MSC/VLR 204 in a Visited Public Land Mobile Network (VPLMN) 206. An HLR 208 resides in a Home Public Land Mobile Network (HPLMN) 210. The HLR includes a plurality of USSD applications 212. An interface 214 is provided between the MSC/VLR and the HLR and utilizes MAP V1 and V2 protocols. In addition, the MSC/VLR 204 includes a plurality of USSD applications 216.

Figure 5:
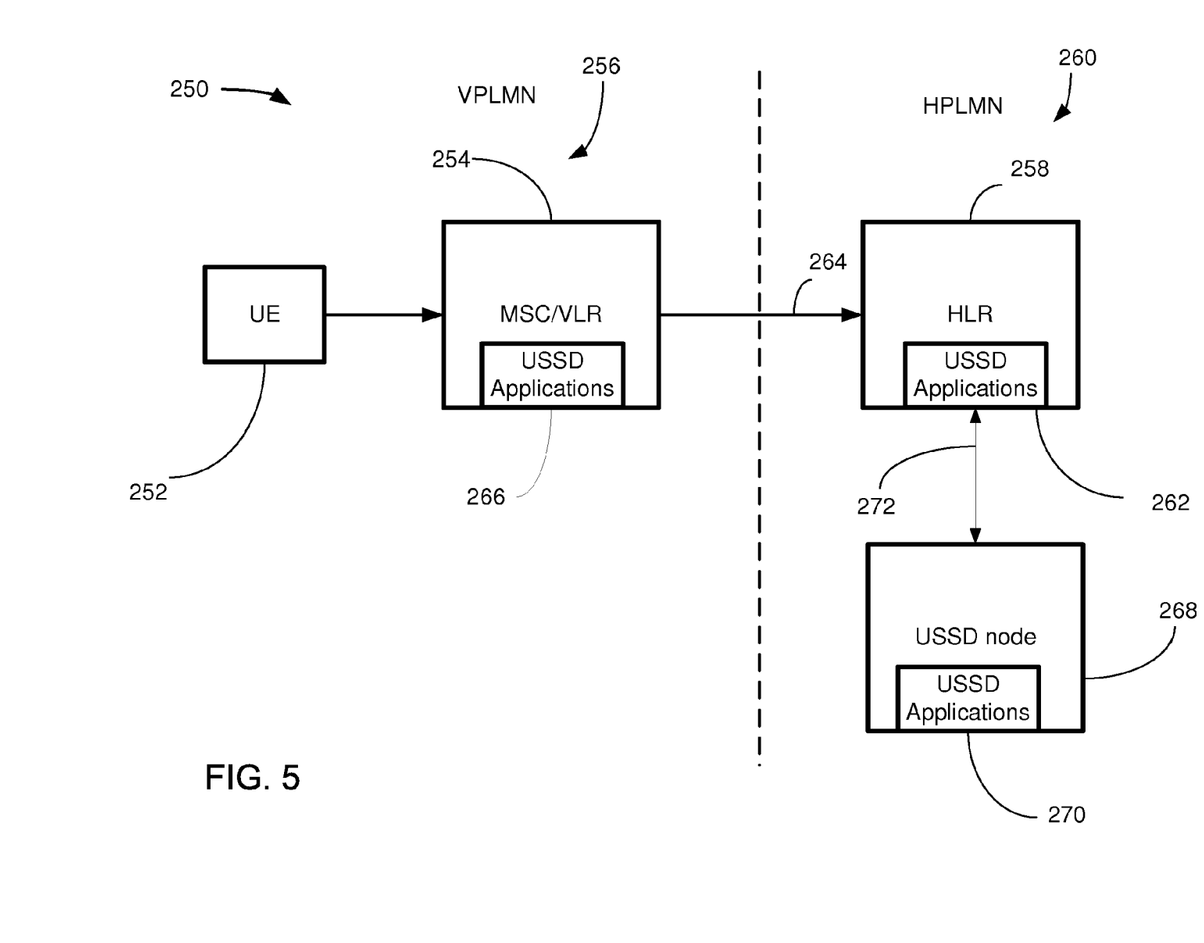
FIG. 5 is a block diagram of a USSD application allocation in a third embodiment of the present invention.

FIG. 5 is a block diagram of a USSD application allocation 250 in a third embodiment of the present invention. The allocation includes a UE 252 and an MSC/VLR 254 in a Visited Public Land Mobile Network (VPLMN) 256. An HLR 258 resides in a Home Public Land Mobile Network (HPLMN) 260. The HLR includes a plurality of USSD applications 262. An interface 264 is provided between the MSC/VLR and the HLR and utilizes MAP V1 and V2 protocols. In addition, the MSC/VLR 254 includes a plurality of USSD applications 266. A USSD node 268 resides in the HPLMN and includes a plurality of USSD applications 270. The HLR communicates with the USSD node through a second interface 272. The interface also utilizes MAP V1 and V2 protocols.

Figure 6:
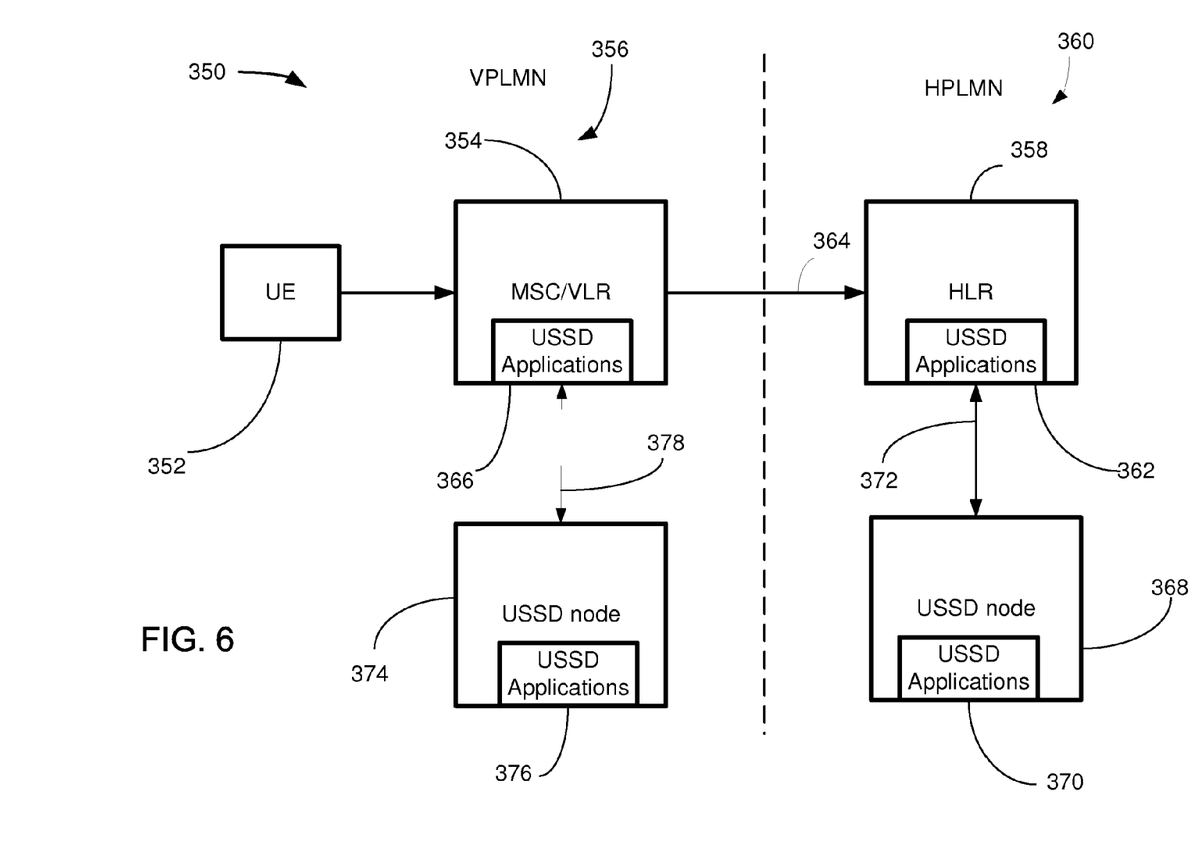
FIG. 6 is a block diagram of a USSD application allocation in a fourth embodiment of the present invention.

FIG. 6 is a block diagram of a USSD application allocation 350 in a fourth embodiment of the present invention. The allocation includes a UE 352 and an MSC/VLR 354 in a Visited Public Land Mobile Network (VPLMN) 356. An HLR 358 resides in a Home Public Land Mobile Network (HPLMN) 360. The HLR includes a plurality of USSD applications 362. An interface 364 is provided between the MSC/VLR and the HLR and utilizes MAP V1 and V2 protocols. In addition, the MSC/VLR 354 includes a plurality of USSD applications 366. A USSD node 368 resides in the HPLMN and includes a plurality of USSD applications 370. The HLR communicates with the USSD node through a second interface 372. The interface 372 also utilizes MAP V1 and V2 protocols. A USSD node 374 resides in the VPLMN and includes a plurality of USSD applications 376. The HLR communicates with the USSD node through a second interface 378. The interface 378 also utilizes MAP V1 and V2 protocols.

The MAP operations may include various messages. For example a processUnstructuredSS-Data may be a mobile originated message using an MAP V1 protocol. A processUnstructuredSS-Request message is a mobile originated message using a MAP V2 protocol. An UnstructuredSS-Request message is a network initiated message using an MAP V2 protocol. An UnstructuredSS-Notify message is a network initiated message using an MAP V2 protocol.

Figure 7:
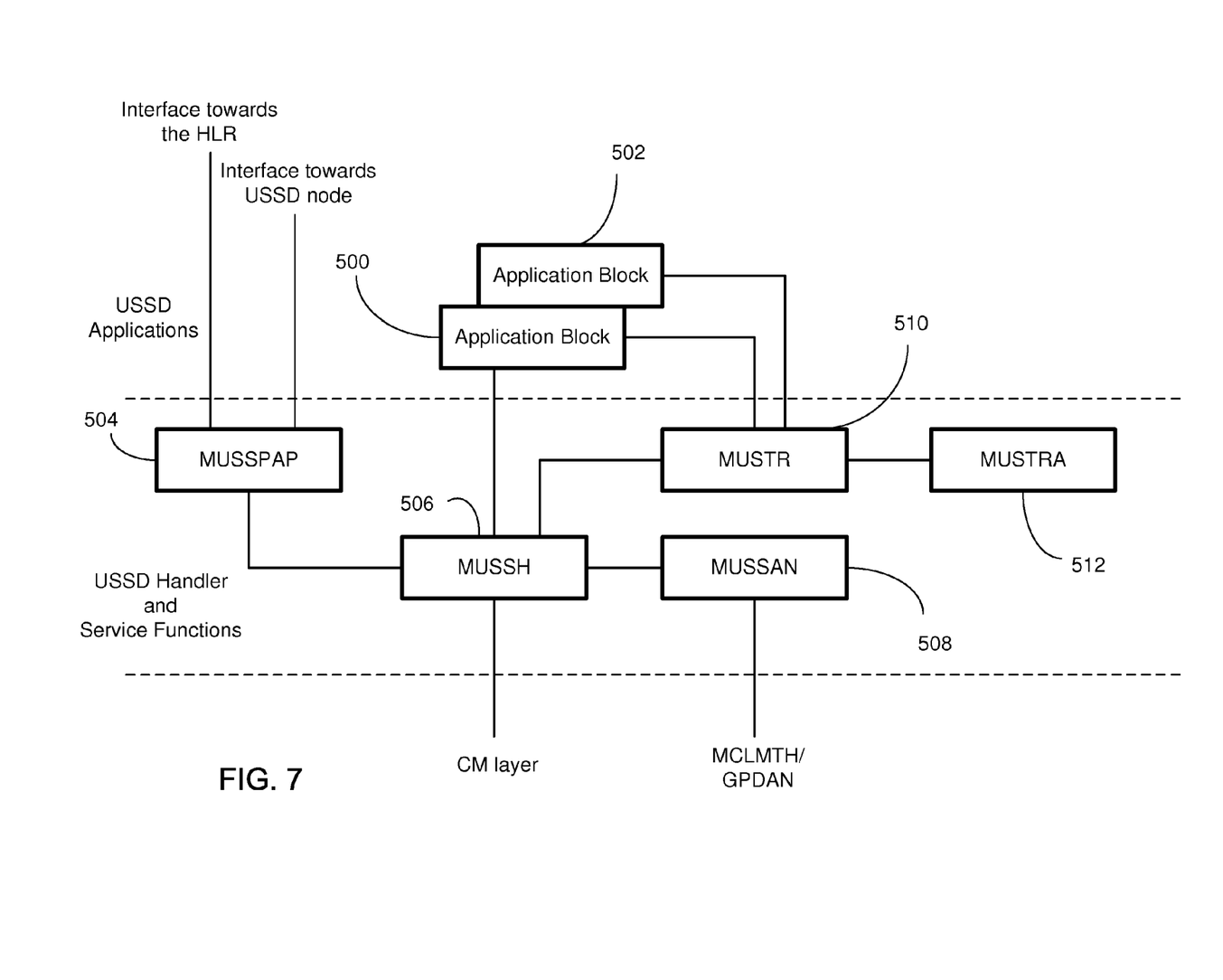
FIG. 7 is a simplified block diagram of components of a modified USSD platform in an alternate embodiment of the present invention.

FIG. 7 is a simplified block diagram of components of a modified USSD platform in an alternate embodiment of the present invention. USSD applications may include one or more Application block 500 and Application block 502. A MUSSPAP 504 provides an interface to an HLR. A MUSSH 506 provides control links to a Call Management (CM) layer and to the USSD applications. In addition, the MUSSH initiates USSD string analysis and performs forwarding, and relay to and from the specific USSD application. A MUSSAN 508 performs USSD string analysis for determining the USSD application. The MUSSAN interfaces with the MCLMTH and the GPDAN. A MUSTR 510 provides USSD string data. A MUSTRA 512 provides administration of the MUSTR. In this embodiment, the MUSSPAP also includes an interface towards external nodes, such as a USSD node.

Figure 8:
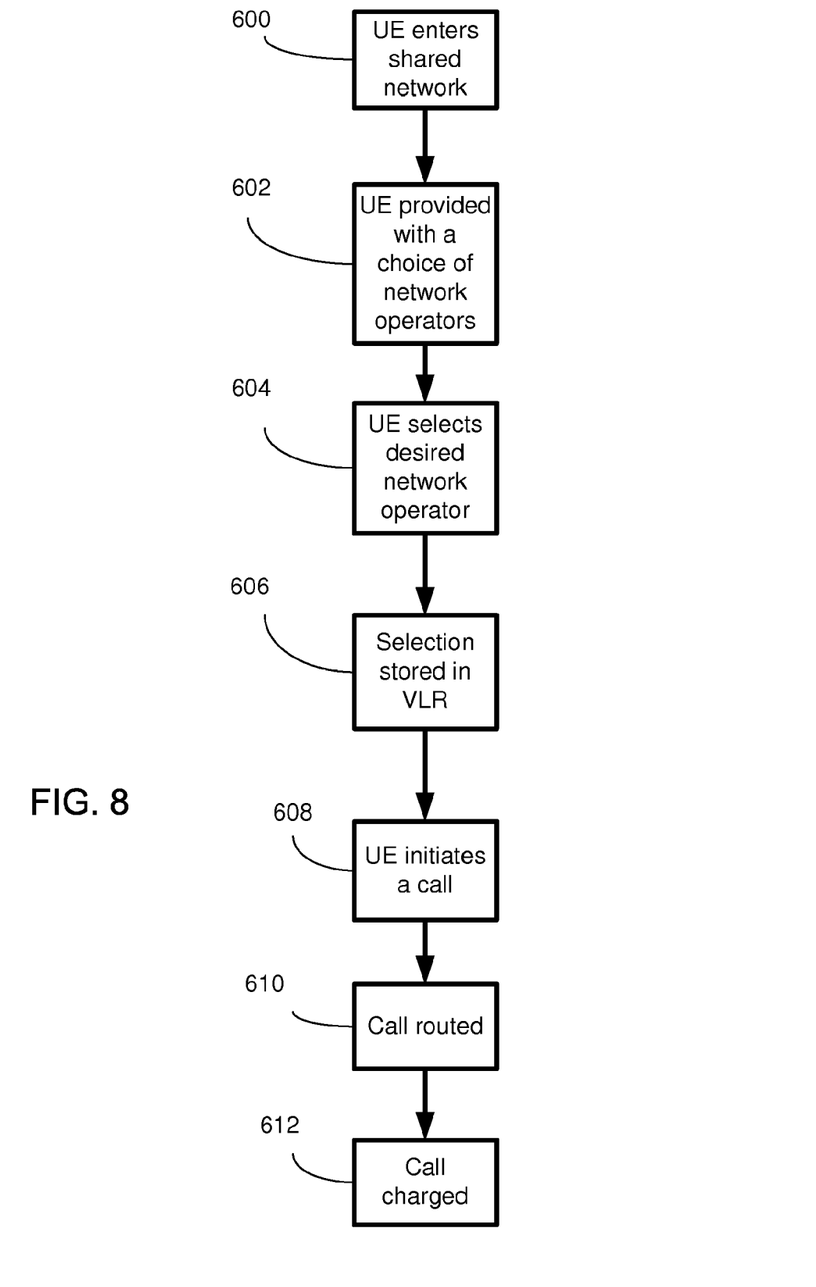
FIG. 8 is a flow chart illustrating the steps of an in-roaming subscriber manually selecting a network operator in a common shared network having only one MNC.

FIG. 8 is a flow chart illustrating the steps of an in-roaming subscriber manually selecting a network operator in a common shared network having only one MNC. With reference to FIGS. 1-8, the method will now be explained. The method begins in step 600 where a UE 10 enters a shared network 12. Next, in step 602, the UE is informed of the arrival into the shared network and provided with a choice of operators for use while roaming within the shared network. Next, in step 604, the in-roaming subscriber (UE), selects a desired network operator. In step 606, the selection is stored in the VLR. Next, in step 608, a call is forward or originated by the UE in the shared network. In step 610, the call is routed in accordance with the selected network operator, e.g. in accordance with rules specified by the respective operator and which may be used for example for B-number analysis. In step 612, each call is charged in accordance with the selected network operator.

The present invention provides a system and method of enabling an in-roaming subscriber to select a desired network operator. The subscriber provides the selection of the network operator to the VLR, preferably via the USSD. The present invention enables a subscriber to easily select a desired network operator with minimal modification to the network.

The present invention may of course, be carried out in other specific ways than those herein set forth without departing from the essential characteristics of the invention. The present embodiments are, therefore, to be considered in all respects as illustrative and not restrictive and all changes coming within the meaning and equivalency range of the appended claims are intended to be embraced therein.

The invention claimed is:

1. A method of selecting a network operator in a shared network, the method comprising the steps of:
    entering the shared network having only one mobile network code by a roaming user equipment (UE);
    querying the UE with a selection of two network operators operating within the shared network;
    selecting a desired network operator from the two network operators includes sending an Unstructured Supplementary Service Data (USSD) string to a node, associating the USSD string to a specified USSD application of a plurality of USSD applications providing the selection of the desired network operator and triggering the USSD application upon receipt of the USSD string within the node, the plurality of USSD applications include transfer of USSD operations towards a Home Location Register (HLR), standard denial of USSD application, indication of tariff area to mobile subscriber, and handling of account information, the USSD application is connected in accordance with the operator via a command that allows defining digit series in a General Purpose Digit Analysis application;
    sending a selection of the desired network operator to the node in the shared network, wherein the node is a first Visitor Location Register (VLR);
    storing the selection in the node;
    initiating a call by the UE in the shared network;
    routing the call in accordance with the selected network operator; and
    charging the call in accordance with tariffs of the selected network operator and storing the selection of the desired network operator in a Mobile Originating and Call forwarding call detail record.

2. The method as recited in claim 1 further comprising the step of: upon the UE changing from the first VLR to a second VLR, forwarding the selection of the desired network operator to the second VLR.

3. The method as recited in claim 1 wherein the step of initiating a call includes forwarding a call in the shared network.

4. The method as recited in claim 1 wherein the step of initiating a call includes originating a call by the UE in the shared network.

5. The method as recited in claim 1 wherein:
    the step of selecting a desired network operator includes selecting an International Mobile Subscriber Identity (IMSI) associated with the desired network operator; and
    the step of sending a selection of the desired network operator includes sending the selected IMSI indicating the desired network operator.

6. The method as recited in claim 1 wherein the step of providing the UE a selection of a network operator includes sending a short message services message to the UE notifying entrance to the shared network and querying the UE of a selection of a network operator.

7. A system for selecting a network operator in a shared network, the system comprising:
   a user equipment roaming in the shared network having only one mobile network code;
   means for querying the UE with a selection of at least two network operators operating within the shared network;
   a node for storing the selected network operator, the node is a first Visitor Location Register (VLR);
   means within the UE for selecting a desired network operator, the means for selecting a desired network operator includes means for sending an Unstructured Supplementary Service Data (USSD) string to the node, the means for sending a USSD string includes associating the USSD string to a specified USSD application of a plurality of USSD applications providing the selection of the desired network operator, the means for sending the USSD string includes triggering the USSD application upon receipt of the USSD string within the node, the plurality of USSD applications include transfer of USSD operations towards a Home Location Register (HLR), standard denial of USSD application, indication of tariff area to mobile subscriber, and handling of account information, the USSD application is connected in accordance with the operator via a command that allows defining digit series in a General Purpose Digit Analysis application;
   means for routing a call initiated in the shared network in accordance with the selected network operator; and
   means for charging the call in accordance with tariffs of the selected network operator and storing the selection of the desired network operator in a Mobile Originating and Call forwarding call detail record.

8. The system as recited in claim 7 further comprising means for forwarding the selection of the desired network operator to a second VLR when the UE changes from the first VLR to the second VLR.

9. The system as recited in claim 7 wherein the means for selecting a desired network operator includes means for selecting an International Mobile Subscriber Identity (IMSI) associated with the desired network operator and sending the selected IMSI to the node.

10. A node for implementing a selected network operator by a roaming user equipment (UE) in a shared network, the node comprising:
    means for querying the UE with a selection of at least two network operators operating within the shared network having only one mobile network code;
    means for receiving and storing a selection of a desired network operator from the UE, the means for receiving and storing a selection of a desired network operator from the UE includes means for receiving an Unstructured Supplementary Service Data (USSD) string, the means for receiving and storing a USSD string includes associating the USSD string to a specified USSD application of a plurality of USSD applications providing the selection of the desired network operator, whereby receipt of the USSD string triggers the USSD application, the node is a first Visitor Location Register (VLR), the plurality of USSD applications include transfer of USSD operations towards HLR, standard denial of USSD application, indication of tariff area to mobile subscriber, and handling of account information, the USSD application is connected in accordance with the operator via a command that allows defining digit series in a General Purpose Digit Analysis application;
    means for routing a call initiated in the shared network by the UE in accordance with the selected network operator; and
    means for charging the call in accordance with tariffs of the selected network operator and storing the selection of the desired network operator in a Mobile Originating and Call forwarding call detail record.

11. The node as recited in claim 10 further comprising means for forwarding the selection of the desired network operator to a second VLR when the UE changes from the first VLR to the second VLR.

12. A method of selecting a network operator in a shared network, the method comprising the steps of:
    entering the shared network having only one mobile network code by a roaming user equipment (UE);
    querying the UE with a selection of two network operators operating within the shared network;
    selecting a desired network operator from the two network operators includes sending an Unstructured Supplementary Service Data (USSD) string to a node, associating the USSD string to a specified USSD application of a plurality of USSD applications providing the selection of the desired network operator and triggering the USSD application upon receipt of the USSD string within the node, the plurality of USSD applications include transfer of USSD operations towards a Home Location Register (HLR), standard denial of USSD application, indication of tariff area to mobile subscriber, and handling of account information, the USSD application is connected in accordance with the operator via a command that allows defining digit series in a General Purpose Digit Analysis application;
    sending a selection of the desired network operator to the node in the shared network, wherein the node is a first Visitor Location Register (VLR);
    storing the selection in the node;
    initiating a call by the UE in the shared network;
    routing the call in accordance with the selected network operator; and
    charging the call in accordance with tariffs of the selected network operator including storing the selection of the desired network operator in a Mobile Originating and Call forwarding call detail record.

13. A system for selecting a network operator in a shared network, the system comprising:
    a user equipment roaming in the shared network having only one mobile network code;
    means for querying the UE with a selection of at least two network operators operating within the shared network;
    a node for storing the selected network operator, the node is a first Visitor Location Register (VLR);
    means within the UE for selecting a desired network operator, the means for selecting a desired network operator includes means for sending an Unstructured Supplementary Service Data (USSD) string to the node, the means for sending a USSD string includes associating the USSD string to a specified USSD application of a plurality of USSD applications providing the selection of the desired network operator, the means for sending the USSD string includes triggering the USSD application upon receipt of the USSD string within the node, the plurality of USSD applications include transfer of USSD operations towards a Home Location Register (HLR), standard denial of USSD application, indication of tariff area to mobile subscriber, and handling of account information, the USSD application is connected in accordance with the operator via a command that allows defining digit series in a General Purpose Digit Analysis application;

means for routing a call initiated in the shared network in accordance with the selected network operator; and means for charging the call in accordance with tariffs of the selected network operator, wherein the means for charging the call in accordance with tariffs of the selected network operator includes storing the selection of the desired network operator in a Mobile Originating and Call forwarding call detail record.

14. A node for implementing a selected network operator by a roaming user equipment (UE) in a shared network, the node comprising:

means for querying the UE with a selection of at least two network operators operating within the shared network having only one mobile network code;

means for receiving and storing a selection of a desired network operator from the UE, the means for receiving and storing a selection of a desired network operator from the UE includes means for receiving an Unstructured Supplementary Service Data (USSD) string, the means for receiving and storing a USSD string includes associating the USSD string to a specified USSD application of a plurality of USSD applications providing the selection of the desired network operator, whereby receipt of the USSD string triggers the USSD application, the node is a first Visitor Location Register (VLR), the plurality of USSD applications include transfer of USSD operations towards HLR, standard denial of USSD application, indication of tariff area to mobile subscriber, and handling of account information, the USSD application is connected in accordance with the operator via a command that allows defining digit series in a General Purpose Digit Analysis application;

means for routing a call initiated in the shared network by the UE in accordance with the selected network operator; and means for charging the call in accordance with tariffs of the selected network operator, wherein the means for charging the call in accordance with tariffs of the selected network operator includes storing the selection of the desired network operator in a Mobile Originating and Call forwarding call detail record.

* * * * *